Patented Nov. 11, 1952

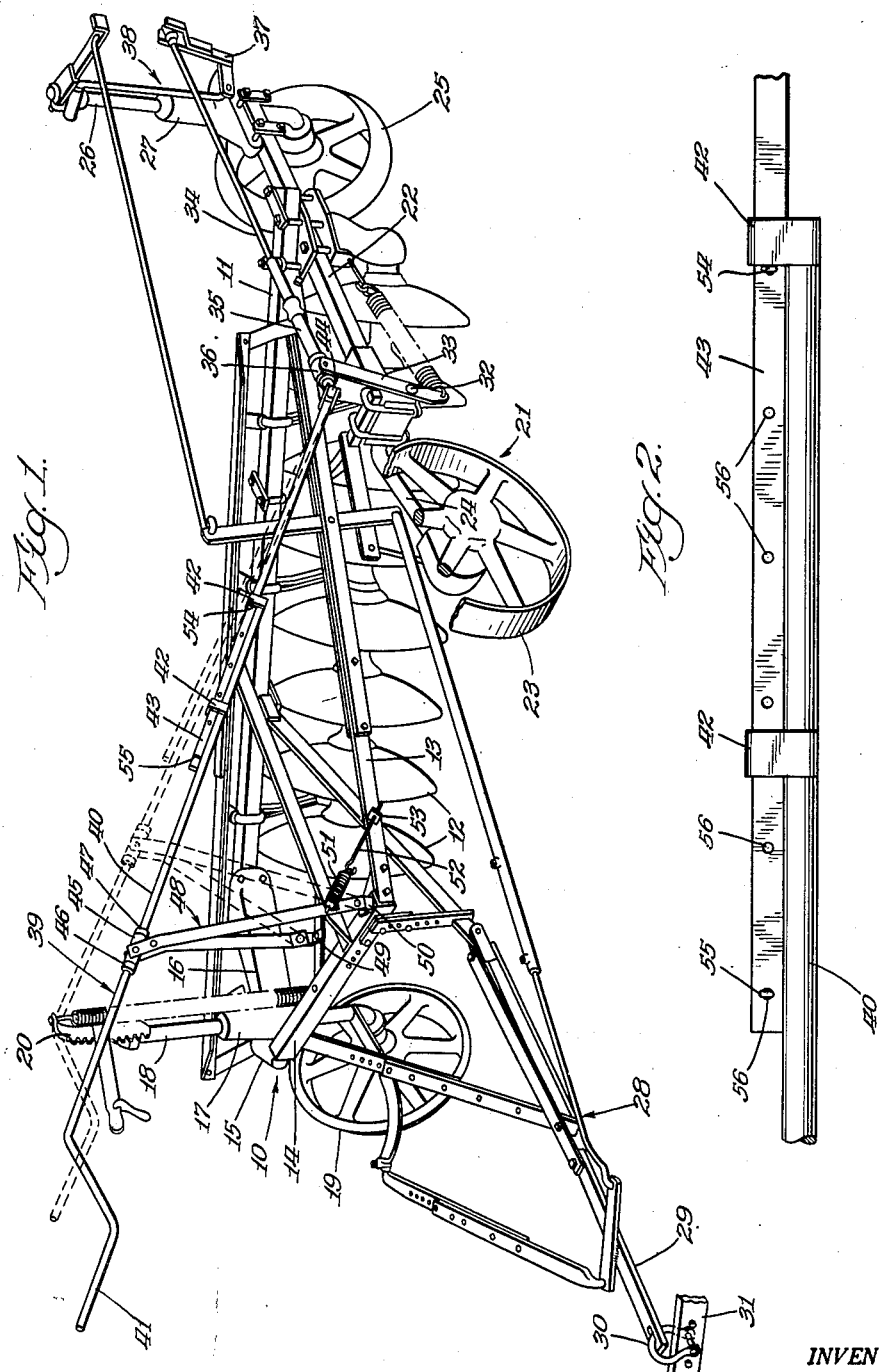

2,617,345

UNITED STATES PATENT OFFICE 2,617,345

SAFETY DEVICE FOR TRAIL-BEHIND AGRICULTURAL IMPLEMENTS

Reginald A. Christie, Ancaster, Ontario, Canada, assignor, by mesne assignments, to International Harvester Company, Chicago, Ill., a corporation of New Jersey Application July 12, 1947, Serial No. 760,647

3 Claims. (Cl. 97—101)

1

This invention relates to agricultural implements and particularly to a trail-behind implement. More specifically, the invention concerns a safety adjusting crank for a tillage tool such as a harrow plow, wherein it is important that the implement be allowed to swing from side to side of the tractor to conform to the direction in which the tractor is steered. In such an implement the operating depth thereof is regulated by the tractor operator through the intermediary of a crank arm extending from the implement adjustable part to a location within easy reach of the tractor operator. Due to the peculiar construction of harrow plows and the like and the fact that they are often attached to tractors having varying types of drawbars, the lateral swinging of the implement as it follows the tractor frequently brings the adjusting crank dangerously close to the tractor operator and bodily injuries therefrom have occured not infrequently.

Likewise, as often happens, the plow is stalled by encountering an obstruction. In avoiding the obstruction the operator reverses the tractor and is injured by backing into the adjusting crank.

The present invention, therefore, has for its object to provide for an agricultural implement an adjusting crank or the like which extends to a location near the operator's station on the tractor but which is provided with a safety feature designed to minimize the likelihood of injury to the operator.

Another object of the invention is to provide in a trail-behind agricultural implement an adjusting crank or the like extending to a location adjacent the operator's station on the tractor by which the implement is propelled, wherein means for provided accommodating yielding of the crank when an obstruction is encountered thereby.

Another object of the invention is to provide in a trail-behind agricultural implement a telescoping adjusting crank extending from the implement to a location adjacent the tractor operator and which is capable of telescoping movement when an obstacle is encountered thereby.

Other objects and advantages of the invention will become clear from the following detailed description when read in conjunction with the accompanying drawings, wherein:

Figure 1 is a view in perspective of a trail-behind harrow plow embodying the features of the present invention; and Figure 2 is a detail of the safety crank therefor.

Referring to the drawings, it will be noted that the implement with which this invention is particularly concerned is a harrow plow of the trail-behind type comprising generally a frame 10 including a diagonally extending beam 11 upon which are mounted a series of earth working discs 12. A longitudinally extending frame

2 member 13 is secured at its rear end to the rear portion of the beam 11 and connected at its forward end to a cross bar 14 secured at its other end to a casting 15 having a portion 16 affixed to the forward end of the beam 11, and a vertically extending spindle portion 17 serving for the sliding reception of an axle 18, the lower end of which is bent outwardly and has journaled thereupon a front furrow wheel 19. This wheel 19 supports the forward end of the frame and is raised and lowered with respect to the frame by a lever and quadrant mechanism 20, the details of operation of which do not form any part of this invention. The rear end of the frame is supported upon a wheeled truck designated by the numeral 21 and including a longitudinally extending beam 22 secured to the rear end of beam 11 and having at one end thereof a land wheel 23 carried upon a crank axle 24 mounted upon the beam 22 for swinging movement. The opposite end of beam 22 is supported upon a rear furrow wheel 25 journaled upon the lower end of an axle 26 slidably received in a vertically extending member 27 carried upon the beam 22.

The forward end of the harrow plow of this invention is provided with a hitch structure designated generally by the numeral 28 and provided with a draft bar 29 having at its forward end a clevis 30 for connection to the draw bar 31 of a tractor of conventional construction having at its rear end an operator's station (not shown).

The crank axle 24 of ground wheel 23 is provided with a transverse portion 32 for securing to the end of beam 22 and having affixed thereto a lever arm 33. Land wheel 23 may thus be adjusted by swinging crank axle 24 with respect to the frame to regulate the depth of operation of the earth working disks or to raise and lower the plow. Motion of the lever 33 to swing the crank axle 24 may be transmitted to the rear furrow wheel 25 through a rod 34 threaded for reception in a threaded sleeve 35 carried in a pivot block 36 pivotally secured to the upper end of the lever 33. The rear end of the rod 34 is connected to a bell crank 37 mounted on the frame and connected by conventional lifting mechanism 38 to the upper end of axle 26 to vertically move the latter in its bearing member 27.

Raising and lowering the frame to adjust the depth of operation of the tools may be accomplished by the operator of the tractor by which the implement is drawn and from his station thereon. By manipulating an adjusting crank 39, which comprises a crank portion 40 having a handle 41 at the end thereof extending to a location adjacent the operator's station on the tractor, and having at its other end spaced socket members 42 adapted to receive for sliding movement a second crank part 43 of square cross section adapted to be seated in the sockets 42 for rotation with the crank portion 40. The rear end of the part 43 is connected by a universal joint 44 to the forward end of the threaded rod 34. Turning of the crank handle 41 therefore transmits rotational motion to the rod 34 rocking the bell crank 37 to raise and lower the frame.

Adjusting crank 39 has mounted thereupon a pivot member 45 held against axial movement with respect thereto by collars 46 and 47. Pivot member 45 is supported by trunnions at the upper end of a triangularly arranged supporting structure 48 pivotally connected at its lower end to lugs 49 and 50 carried on the frame. Triangular supporting member 48 thus is capable of pivotal movement longitudinally of the implement and in a direction axially of the adjusting crank 39.

In normal operating position the safety adjusting crank 39 is in the position shown in solid lines in Figure 1. In this position the supporting standard 48 has pivoted somewhat forwardly of a vertical center line through the pivot axis thereof and the crank is accessible to the tractor operator for adjusting the implement. Likewise, in this position the adjusting crank and its supporting structure are balanced by a spring 51 connected at one end to the supporting standard 48 and to a threaded rod 52 adjustably received in a bracket 53 mounted upon the frame.

It has previously been pointed out that an implement of this type is often unusually large and heavy and is articulately connected to the tractor in such a way that it may swing laterally to follow the tractor during turning thereof. This buckling of the implement with respect to the tractor brings the handle 41 of the adjusting crank 39 dangerously close to the tractor operator and injuries have not infrequently occurred therefrom. Due to the pivotal mounting of the adjusting crank 39 upon the frame and the telescoping arrangement of the parts 40 and 43, the danger of injury to the tractor operator has been eliminated. Upon encountering an obstruction at its forward end the crank portion 40 moves rearwardly about the pivotal connection of the standard 48 to the plow frame and telescopes with respect to the part 43. It is desirable to limit the telescoping movement of the safety adjusting crank and for this purpose cotter keys 54 and 55 are provided for reception in openings 56 in the part 43. It will be noted in Figure 2 that in the solid line position shown in Figure 1 the cotter key 54 abuts the rearmost socket member 42. When the adjusting crank has swung rearwardly to the position shown in dotted lines in Figure 1 the telescoping of the crank parts is limited by engagement of the cotter key 55 with the forwardmost of the sockets 42. When the adjusting crank has swung rearwardly to the dotted line or collapsed position shown, it is brought back to its operating position merely by the operator grasping the handle and pulling it forward until the supporting standard 48 has swung forwardly past the pivots upon which it is mounted.

It is believed that the safety adjusting crank for harrow plows and the like will be clearly understood from the foregoing description. Modifications may of course be made therein without departing from the spirit of the invention or the scope of the appended claims.

What is claimed is:

1. In an agricultural implement adapted for connection to a tractor, a frame having hitch means for pivotal connection of the implement to the tractor, earth working tools carried by the frame, wheels supporting the frame and movable with respect thereto to vary the position of the earth working tools with respect to the ground and adjust the operating depth thereof, an adjusting member carried by the implement for vertically moving the frame with respect to the wheels, said adjusting member extending longitudinally to a location adjacent the operator's station on the tractor to be operated therefrom, including relatively movable parts accommodating yielding thereof longitudinally when an obstruction is encountered thereby, and a supporting standard for the adjusting member mounted on the implement on a transverse axis for longitudinal movement with said adjusting member.

2. In an agricultural implement adapted for connection to a tractor, a frame having hitch means for pivotal connection of the implement to the tractor, earth working tools carried by the frame, wheels supporting the frame and movable with respect thereto to vary the position of the earth working tools with respect to the ground and adjust the operating depth thereof, an adjusting member carried by the implement for vertically moving the frame with respect to the wheels, said adjusting member comprising an elongated telescoping rod operatively connected with said wheels and said frame to raise and lower the latter and having a crank at its other end extending to a location adjacent the operator's station on the tractor, and a support for said rod connected to the frame for pivotal movement longitudinally of the implement and in a direction axially of the adjusting member to accommodate telescoping of said rod when an obstruction is encountered thereby.

3. In an agricultural implement adapted for connection to a tractor, a frame having hitch means for pivotal connection of the implement to the tractor, earth working tools carried by the frame, wheels supporting the frame and movable with respect thereto to vary the position of the earth working tools with respect to the ground and adjust the operating depth thereof, an adjusting member carried by the implement for vertically moving the frame with respect to the wheels, said adjusting member comprising an elongated telescoping rod operatively connected with said wheels and said frame to raise and lower the latter and having a crank at its other end extending to a location adjacent the operator's station on the tractor, and a support for said rod medially of its ends pivotally mounted on said frame for swinging movement longitudinally of the implement and in a direction axially of the adjusting member to accommodate telescoping of the rod when an obstruction is encountered thereby, and stop means limiting the movement of said telescoping parts in either direction.

REGINALD A. CHRISTIE.

REFERENCES CITED

The following references are of record in the file of this patent:

UNITED STATES PATENTS

| Number | Name | Date |
|---|---|---|
| 2,221,332 | Sibel | Nov. 12, 1940 |
| 2,243,989 | Strandlund | June 3, 1941 |
| 2,269,519 | Christenson | Jan. 13, 1942 |
| 2,344,123 | Brown et al. | Mar. 14, 1944 |